United States Patent
Milne

[15] 3,643,290
[45] Feb. 22, 1972

[54] BUSHING AND BUSHING ASSEMBLY

[72] Inventor: John D. Milne, c/o 62 Shaft Road, Rexdale, Ontario, Canada

[22] Filed: Dec. 1, 1969

[21] Appl. No.: 881,215

[52] U.S. Cl. ................................................16/2, 248/56
[51] Int. Cl. .........................................................F16l 3/00
[58] Field of Search ....................16/2, 109; 248/27, 56, 57; 24/20, 114.5, 123 A, 256, 249 LS; 285/419, 373, 213, 397; 138/96; 308/237, 238

[56] References Cited

UNITED STATES PATENTS

| | | | |
|---|---|---|---|
| 2,448,769 | 9/1948 | Chamberlain | 24/249 LS X |
| 2,762,117 | 9/1956 | Houck | 16/2 |
| 3,366,356 | 1/1968 | Fisher | 16/2 X |
| 3,518,727 | 7/1970 | Eberle et al. | 16/2 X |

Primary Examiner—Casmir A. Nunberg
Assistant Examiner—Peter A. Aschenbrenner
Attorney—Maybee and Legris

[57] ABSTRACT

A bushing comprising a cylindrical portion, and a flange portion presented at one end of the cylindrical portion and projecting outwardly from and around the cylindrical portion. The bushing is axially split throughout its length, a plurality of circumferentially spaced openings being formed through the flange portion of the bushing on one side of the split, and one or more locking pins projecting from the flange portion on the other side of the split so that, depending on which of the openings the or each pin is disposed through, the diameter of the bushing which is formed of a resiliently deformable material can be varied. In an alternative embodiment the plurality of openings are formed transverse to the axis of the bushing rather than through the flange portion, and instead of the above-mentioned pin or pins a single circumferentially disposed locking pin is presented by the flange portion on the above-mentioned other side of the axial split, the pin having a tooth which is engageable with the farthest opening from the split through which the pin is disposed thereby again permitting the diameter of the bushing to be varied. Two or more of the bushings may be assembled together with the locking pin or pins presented by one of the bushings in engagement with selected openings provided in the other bushing and with the locking pin or pins presented by said other bushing in engagement with selected openings in the first-mentioned bushing. Thus, a bushing assembly is provided, the diameter of the assembly being variable within a range of sizes which is substantially greater than the range of sizes which can be achieved using only one of the bushings. Furthermore, a game comprising a plurality of the bushings together with a board formed with a plurality of holes may be provided. The holes in the board are of different sizes, and the adjustable sizes of the bushings are such that, in relation to each hole in the board, only one of the bushings has an adjustable size which corresponds to the size of said hole.

17 Claims, 10 Drawing Figures

PATENTED FEB 22 1972 3,643,290
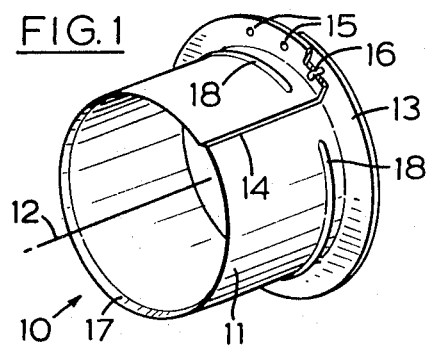
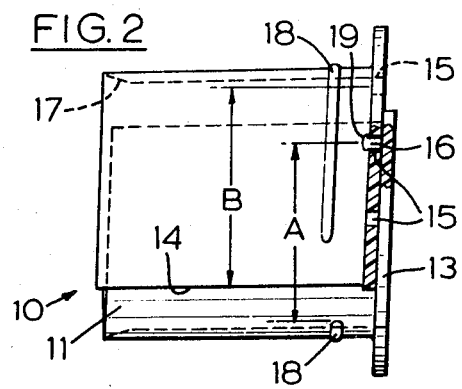
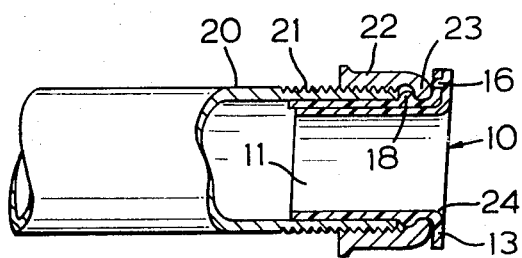
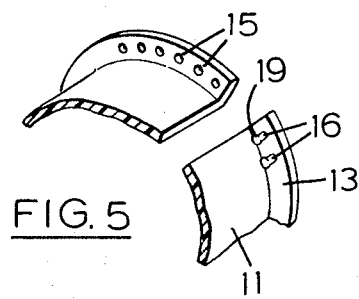
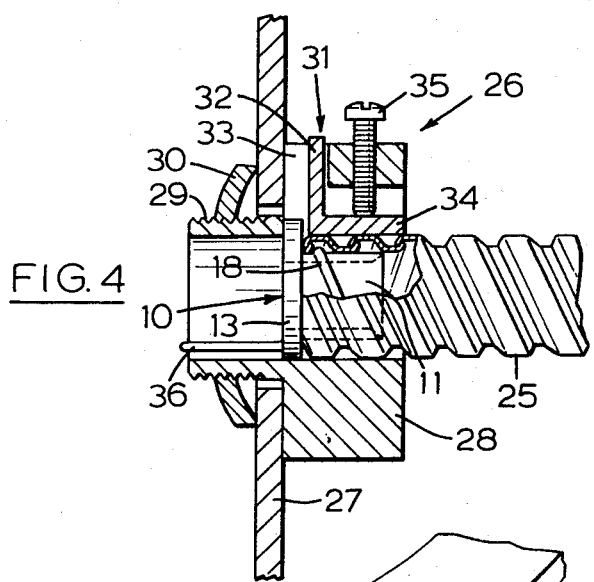
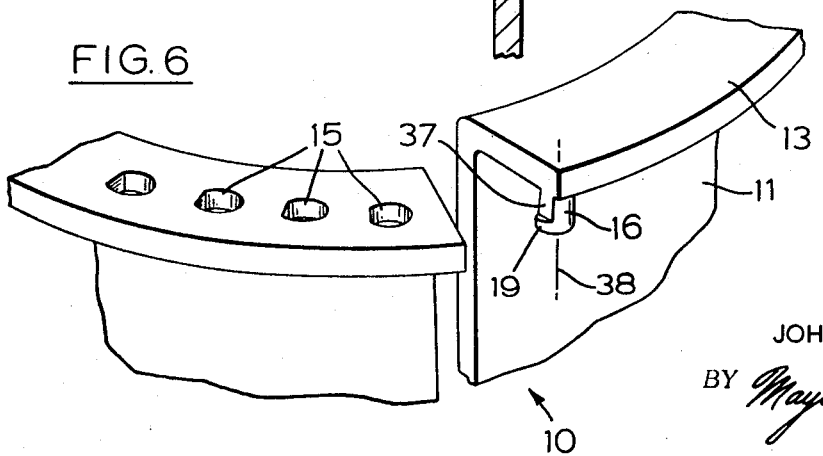
INVENTOR.
JOHN D. MILNE
BY Maybee & Legris
ATTORNEYS

INVENTOR.
JOHN D. MILNE

BY Maybee & Legris
ATTORNEYS

BUSHING AND BUSHING ASSEMBLY

This invention is concerned with bushings, such as bushings of the type operatively mounted within the end portions of, for example, metal conduit, such as flexible aluminum conduit, or conduit of the type incorporated in the armored form of cable known as AC cable, electrical wiring or the like being operatively disposed through the conduit and through the bushing which thereby prevents chafing of the wiring against the edge of the conduit where the wiring passes from the conduit to, for example, an electrical junction box to which the conduit is secured by a coupling assembly which may be of conventional form.

Hitherto, bushings of the above-described type have each been of a fixed size, i.e., the size of the bushing in the direction perpendicular to the longitudinal axis thereof has been fixed. While such bushings function reasonably satisfactorily when in use, they suffer from the disadvantage that, being of a fixed size, each bushing can be used only with conduit of a specific internal size with the result that electrical contractors and the like have required to maintain in stock a very large supply of differently sized bushings since, of course, conduit in association with which such bushings are used is available in a large number of sizes, and it is necessary for bushings which are used with a specific size of conduit to be themselves of a specific size, the bushings, of necessity, being a close engaging fit within the conduit when operatively disposed therein.

It is a primary object of the present invention to provide a bushing of the type described above in which the size of the bushing can be varied, thereby permitting a single bushing to be used in conduits of different sizes with resultant savings to electrical contractors and the like who need thereby stock a much smaller range of bushings than hitherto and still be able to supply bushings which fit properly any of the numerous sizes of conduits which may be used.

A bushing according to the present invention comprises a tubular portion having a longitudinal axis, and a flange portion which is presented at one end of the tubular portion and which projects outwardly from and around the tubular portion, the bushing which is formed of a flexible material, and preferably a stiff but resiliently deformable material such as linear polyethylene or nylon, having a discontinuity extending throughout its axial length. The bushing has on one side of the discontinuity a plurality of peripherally spaced openings, the bushing presenting on the other side of the discontinuity at least one projecting locking pin which is disposable selectively through the openings for locking engagement therewith, thereby to permit variation in the size of the bushing in the direction perpendicular to the longitudinal axis of the tubular portion.

The tubular portion is preferably of substantially cylindrical form, and in one preferred embodiment of the invention the openings are substantially equidistantly spaced from the longitudinal axis of the cylindrical portion and are formed through the flange portion, the locking pin being spaced from the longitudinal axis of the cylindrical portion a distance substantially equal to the distance by which the openings are spaced from said axis and being disposable through a selected one of the plurality of openings for engagement therewith, thereby to permit the above-mentioned variation in the size of the bushing.

In an alternative preferred embodiment of the invention, the openings differ from those in said one preferred embodiment in that they are disposed substantially transverse to said longitudinal axis, a single-locking pin which is circumferentially disposed and which presents a projecting tooth being disposable through any selected number of the openings from the opening circumferentially most closely adjacent to the discontinuity for locking engagement of the projecting tooth with the opening which, of the openings through which the pin is disposed, is circumferentially farthest spaced from the discontinuity thereby again to permit the above-mentioned variation in the size of the bushing.

A bushing assembly according to the invention comprises a plurality of identical bushings according to the invention, said at least one locking pin presented by each of the bushings being disposed selectively through the openings provided in the remaining bushing or in an adjacent one of the remaining bushings.

In order that the invention may be more clearly understood and more readily carried into effect the same will now, by way of example, be more fully described with reference to the accompanying drawings in which FIG. 1 is an isometric view of a bushing according to a first preferred embodiment of the invention, part of the bushing being broken away for clarity;

FIG. 2 is a side view of the bushing illustrated in FIG. 1, part of the bushing again being broken away for clarity;

FIG. 3 is an axially sectioned side view of a bushing as shown in FIGS. 1 and 2 operatively mounted within an end portion of a metal conduit, the bushing being shown to a reduced scale as compared with FIGS. 1 and 2;

FIG. 4 is a side view of a bushing according to the present invention operatively installed within an end portion of the conduit of a length of AC cable, with the conduit being secured by a coupling assembly to the wall of, for example, an electrical junction box, the connector assembly and the wall being shown in section and part of the conduit of the AC cable being broken away for clarity;

FIG. 5 is an isometric view of part of a bushing according to a modified form of the embodiment illustrated in FIG. 1;

FIG. 6 is also an isometric view of part of a bushing according to a further modified form of the embodiment illustrated in FIG. 1;

Like reference numerals are used throughout the drawings to denote like parts.

Figure 9:
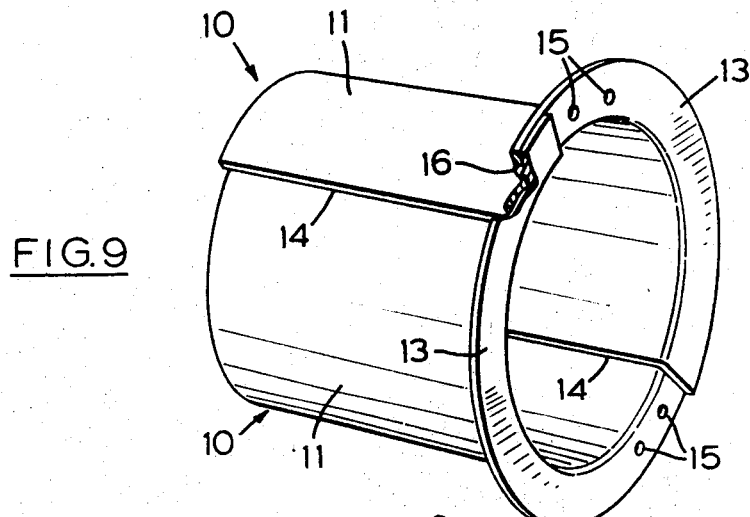
FIG. 9 is an isometric view of a bushing assembly according to the invention, the assembly comprising two bushings according to the first preferred embodiment illustrated in FIG. 1.

With reference to the drawings, and particularly FIGS. 1 and 2 thereof, 10 denotes generally an electrical antishort bushing which is integrally formed, for example by a molding operation, of a flexible material and preferably a stiff but resiliently deformable material, such as linear polyethylene or nylon. The bushing 10 comprises a tubular portion 11 which is preferably of cylindrical form and which has a longitudinal axis 12. The bushing 10 also comprises a flange portion 13 which is presented at one end of the cylindrical portion 11 and which projects outwardly from and around the cylindrical portion 11, the flange portion 13 being, in the preferred embodiments illustrated in the drawings, of substantially planar, annular form with the plane containing the portion 13 disposed substantially at right angles to the longitudinal axis 12.

The bushing 10 is formed with an axial split 14 and thus has a discontinuity extending throughout its axial length, i.e., the bushing 10 is circumferentially discontinuous throughout its axial length. On one side of the discontinuity 14 the bushing 10 has a plurality of peripherally spaced openings 15 which, in the preferred embodiment illustrated in FIGS. 1 and 2, are circumferentially spaced and are formed through the flange portion 13, the openings 15 being substantially equidistantly spaced from the longitudinal axis 12. On the other side of the discontinuity 14 the bushing 10 presents a projecting locking pin 16 which is disposable selectively through the openings 15 for locking engagement therewith, thereby to permit variation in the size of the bushing 10, i.e., in the diameter thereof in the direction perpendicular to the longitudinal axis 12. In FIG. 1, the locking pin 16 which is spaced from the longitudinal axis 12 a distance substantially equal to the distance by which the openings 15 are spaced from the axis 12 is shown as being disposed through the opening 15 most closely adjacent to the discontinuity 14, while in FIG. 2 the locking pin 16 is shown as being disposed through the second opening 15 from the discontinuity 14. Thus, as will be appreciated, the pin 16 may be disposed through any selected one of the openings 15 thereby to vary the diameter of the bushing 10.

As shown at 17 the end of the cylindrical portion 11 remote from the end thereof from which the flange portion 13 is presented is internally chamfered. The purpose of this chamfering 17 is to facilitate the entry of the bushing 10 into the end portion of a conduit and to reduce the risk of the end of the cylindrical portion 11 remote from the end from which the flange portion 13 is presented damaging the paper covering, which is usually disposed around electrical wiring within a conduit, during the above-mentioned entry of the bushing 10 into the end portion of the conduit.

A peripherally disposed, outwardly projecting rib 18 is presented by the cylindrical portion 11 between the ends thereof. Although in FIGS. 1 and 2, the rib 18 is shown as being disposed closely adjacent to the end of the cylindrical portion 11 from which the flange portion 13 is presented, it is to be understood that the rib 18 may be disposed at any desired position between the ends of the portion 11, and may, for example, be disposed immediately adjacent the end of the portion 11 remote from the flange portion 13.

The circumferentially disposed rib 18 terminates, on the side of the discontinuity 14 from which the pin 16 projects, at a circumferential distance from the pin 16 which is at least as large as the circumferential distance between the discontinuity 14 and the opening 15 which is circumferentially farthest spaced from the discontinuity 14, the pin 16, which extends in the direction substantially parallel to the longitudinal axis 12, being disposed on the same side of the flange portion 13 as the cylindrical portion 11. In other words and with particular reference to FIG. 2, the circumferential distance A is at least as large as the circumferential distance B. In this manner, the pin 16 can be disposed through the opening 15 which is circumferentially farthest from the discontinuity 14 without any portion of the rib 18 being disposed between the overlapped parts of the cylindrical portion 11. Displacement of the overlapping parts of the cylindrical portion 11 which would be caused by the presence therebetween of the rib 18 is thus avoided.

The end of the locking pin 16 remote from the flange portion 13 preferably presents a lip 19 which projects from the pin 16 in a direction substantially transverse to the longitudinal axis 12, the lip 19 being spaced from the flange portion 13 a distance substantially equal to the thickness of the flange portion 13. The lip 19 preferably projects from the pin 16 in the circumferential direction illustrated in FIG. 2 thereby substantially to prevent unauthorized withdrawal of the pin 16 from the appropriate opening 15 which is required in order to permit the diameter of the bushing 10 to be reduced for removal of the bushing from an end of a conduit, as is hereinafter more fully explained.

The length of the locking pin 16 is substantially equal to the thickness of the flange portion 13 so that, when the bushing 10 is in use, the end of the pin 16 remote from the part of the flange portion 13 from which it projects is substantially flush with the appropriate face of the flange portion 13 at the position of the opening 15 through which the pin 16 is disposed.

With particular reference to FIG. 3, the bushing 10 is therein shown in it operative condition within an end portion of a metal conduit 20. The end portion of the conduit 20 is screw-threaded as shown at 21, a lockring 22 being screw-threadedly engaged with the screw-threading 21, with the annular end portion 23 of the lockring 22 disposed between the rib 18 and the flange portion 13. Thus, the rib 18 is effectively clamped between the end face of the conduit 20 and the end portion 23 of the lock ring 22 thereby to prevent accidental or unauthorized axial withdrawal of the bushing 10 from the conduit 20. Electrical wiring (not shown) is operatively disposed through the conduit 20 and through the bushing 10, the smoothly curved edge 24 of the bushing 10 serving to prevent wear on the electrical wiring where the wiring passes from the end of the conduit 20.

With particular reference to FIG. 4, 25 denotes the conduit of a length of AC cable, the conduit being constituted by an interlocking spiral metal tape of hard drawn aluminum or galvanized steel. Such a conduit, which is of conventional form, has a high degree of flexibility. A bushing 10 is disposed within the end portion of the conduit 25, a rib 18 which is presented by a cylindrical portion 11 of the bushing 10 being of part-helical form and being disposed within a helical groove presented by the interlocking spiral tape constituting the conduit 25.

A coupling assembly denoted generally by the reference numeral 26 serves to secure the end portion of the conduit 25 to a wall 27 of, for example, an electrical junction box. The assembly 26 comprises a body portion 28 having an externally screw-threaded tubular part 29, and a lockring 30 which is screw-threadedly engaged with the part 29 and which serves to secure the assembly 26 to the wall 27. The assembly 26 also comprises a clamping plate 31 having a first limb 32 which is slidably mounted within a slot 33 formed in the body portion 28 and a second limb 34 which is operatively urged into secure clamping engagement with the end portion of the conduit 25 by means of a locking screw 35 screw-threadedly engaged through the body portion 28.

The bushing 10 illustrated in FIG. 4 is substantially identical to that shown in FIGS. 1 and 2 and differs therefrom only in that the rib 18 is, as stated above, of part-helical form and is not therefore parallel to the flange portion 13 whereas in the embodiment illustrated in FIGS. 1 and 2 the rib 18 is substantially parallel to the flange portion 13, and in that the flange portion 13 presents one or more prongs 36 which project from the flange portion 13 substantially parallel to the longitudinal axis 12 and in the opposite direction to the cylindrical portion 11. As is shown in FIG. 4, the end portion of the prong 36 remote from the flange portion 13 projects beyond the tubular part 29 and can therefore be viewed through, for example, an inspection opening in the electrical junction box thus permitting an inspector to confirm that the bushing 10 has, in fact, been installed. As will be appreciated, without the prong 36 it would not be possible for an inspector to confirm that the bushing 10 has been installed without at least partially dismantling the coupling assembly 26.

The end portion of the prong 36 which projects beyond the tubular part 29 may be engraved, stamped or otherwise marked with a symbol denoting, for example, the type of the bushing 10, thereby permitting the inspector to confirm not only that a bushing has been installed but also that it is the correct type of bushing which has been installed.

FIG. 5 shows part of a bushing according to an alternative form of the embodiment illustrated in FIGS. 1 and 2. This alternative form differs from that shown in FIGS. 1 and 2 in that there is a plurality of locking pins 16, the pins 16 being circumferentially equispaced, and the plurality of openings 15 being likewise circumferentially equispaced, with the distance between each opening 15 and the opening 15 adjacent thereto being substantially equal to the distance between each locking pin 16 and the pin adjacent thereto. Although in FIG. 5 the cylindrical portion 11 is not shown as presenting a rib 18, it is to be understood that such a rib 18 may, of course, be presented by the cylindrical portion 11 in this alternative form of the embodiment.

The further alternative form of bushing which is shown in FIG. 6 differs from the embodiment illustrated in FIGS. 1 and 2 in that the locking pin 16 is, in cross section, in the form of a major segment of a circle, the lip 19 and the end of the pin 16 from which the lip 19 is presented being together of substantially circular cross section. The flat face 37 of the pin 16 is substantially flush with the discontinuity 14 in the flange portion 13, the pin 16 being at right angles to the plane containing the longitudinal axis 12 and the axis 38 of the pin 16, of progressively increasing width in the direction away from the flange portion 13. The angle between the axis 38 and the plane containing the flat face 37 of the pin 16 is preferably of the order of 5°.

Figure 7:
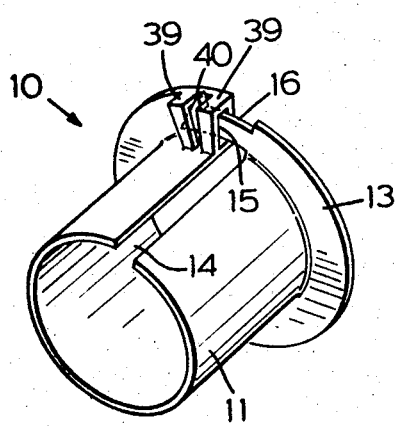
FIG. 7 is an isometric view, corresponding to FIG. 1, of a bushing according to a second preferred embodiment of the invention.
Figure 8:
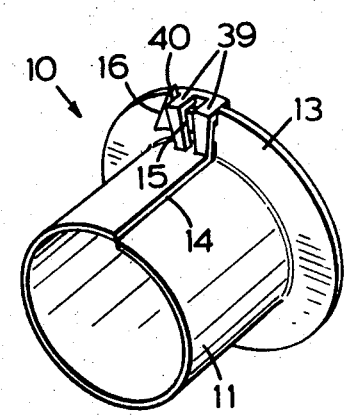
FIG. 8 is a view corresponding to FIG. 7 showing the second preferred embodiment illustrated therein, but in a different operative condition.

The embodiment of the invention illustrated in FIGS. 7 and 8 differs from that shown in FIGS. 1 and 2 primarily in that the plurality of openings 15, which are substantially equidistantly spaced from the longitudinal axis 12, are disposed substantially transverse to said axis 12, the face of the flange portion 13 from which the cylindrical portion 11 projects having a plurality of circumferentially spaced rib portions 39 through which the openings 15 are formed. The locking pin 16 is circumferentially disposed and is spaced from the longitudinal axis 12 a distance substantially equal to the distance by which the openings 15 are spaced from the axis 12, the pin 16 presenting a projecting tooth 40 which is operatively disposed through any selected number of the openings 15 from the opening 15 circumferentially most closely adjacent to the discontinuity 14, for locking engagement of the tooth 40 with the opening 15 which, of the openings 15 through which the pin 16 is disposed, is circumferentially farthest spaced from the discontinuity 14. Thus, the diameter of the bushing 10 can be varied as in the case of the embodiment illustrated in FIGS. 1 and 2, the pin 16, in the operative condition of the bushing 10 as shown in FIG. 7, being disposed through only the opening 15 which is circumferentially most closely adjacent to the discontinuity 14, while the pin 16 with the bushing 10 disposed in the operative condition illustrated in FIG. 8 being disposed through both of the openings 15. Again, in the embodiment illustrated in FIGS. 7 and 8 the cylindrical portion 11 does not present a rib 18, although it is to be understood that such a rib 18 could, of course, be incorporated in this embodiment.

Thus, a bushing 10 according to the present invention is adjustable in diameter to any one of a plurality of diameters, with the result that an electrical contractor or the like requires to stock only a limited range of such bushings in order to be able to provide a bushing the diameter of which can correspond to the diameter of a conduit of any one of a large range of diameters.

With reference to FIG. 9 of the drawings, there is therein illustrated a bushing assembly comprising a plurality of two identical bushings 10 each of which is of the form illustrated in FIGS. 1 and 2. The locking pin 16 presented by each of the bushings 10 is disposed through a selected one of the openings 15 formed in the flange portion 13 of the other bushing 10. Thus, the bushing assembly constitutes, in effect, a bushing the diameter of which is adjustable within a range which is substantially greater than the range within which the diameters of each of the individual bushings 10 constituting the assembly may be adjusted.

While the bushing assembly illustrated in FIG. 9 comprises merely two bushings 10, it is to be understood that the bushing assembly may comprise three or more bushings 10.

Figure 10:
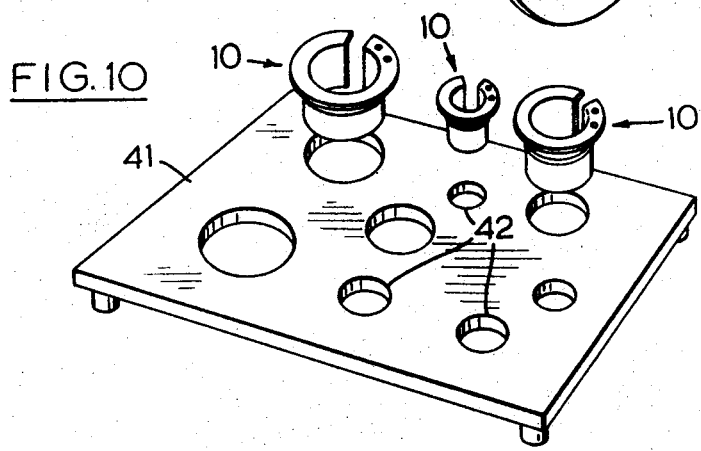
FIG. 10 is an isometric view of a game which includes a board and a plurality of bushings according to the first preferred embodiment illustrated in FIG. 1.

Referring finally to FIG. 10 of the drawings, there is therein illustrated a game comprising a board formed with a plurality of holes 42, and a plurality of bushings 10 each of which is of the form illustrated in FIGS. 1 and 2. The plurality of bushings 10 is equal in number to the plurality of holes 42, the holes 42 being of different sizes, and the adjustable diameters of the bushings 10 being such that, in relation to each hole 42, only one of the bushings 10 has an adjustable diameter which corresponds to the diameter of said hole 42. Thus, the game may be used to provide amusement to young children, although as will be appreciated the game is also of an educational character since it necessitates the child determining which of the plurality of bushings 10 has an adjustable diameter corresponding to the diameter of each of the holes 42.

What I claim as my invention is:

1. A bushing comprising a tubular portion having a longitudinal axis, and a flange portion which is presented at one end of the tubular portion and which projects outwardly from and around the tubular portion, the bushing which is formed of a flexible material having a discontinuity extending throughout its axial length, wherein the bushing has on one side of the discontinuity a plurality of peripherally spaced openings, and the bushing on the other side of the discontinuity presents at least one projecting locking pin which is disposable selectively through the openings for locking engagement therewith, thereby to permit variation in the size of the bushing in the direction perpendicular to the longitudinal axis of the tubular portion.

2. A bushing according to claim 1, wherein the bushing is formed of a stiff but resiliently deformable material.

3. A bushing according to claim 1, wherein a peripherally disposed, outwardly projecting rib is presented by the tubular portion between the ends thereof.

4. A bushing according to claim 1, wherein the end of the tubular portion remote from said one end thereof is internally chamfered.

5. A bushing assembly comprising a plurality of identical bushings according to claim 1, wherein said at least one locking pin presented by each of the bushings is disposed selectively through the openings provided in the remaining bushing, or in an adjacent one of the remaining bushings.

6. A game comprising, in combination, a plurality of bushings according to claim 1, and a board formed with a plurality of holes equal in number to the plurality of bushings, the holes in the board being of different sizes, and the adjustable sizes of the bushings in the directions perpendicular to the longitudinal axes of the tubular portions thereof being such that, in relation to each hole, only one of the bushings has an adjustable size which corresponds to the size of said hole.

7. A bushing comprising a substantially cylindrical portion having a longitudinal axis, and a flange portion which is presented at one end of the cylindrical portion and which projects outwardly from and around the cylindrical portion, the bushing which is formed of a flexible material being circumferentially discontinuous throughout its axial length, wherein on one side of the discontinuity a plurality of circumferentially spaced openings which are substantially equidistantly spaced from the longitudinal axis of the cylindrical portion are formed through the flange portion and wherein on the other side of the discontinuity the flange portion presents at least one projecting locking pin which is spaced from the longitudinal axis of the cylindrical portion a distance substantially equal to the distance by which the openings are spaced from said axis, and which is disposable through a selected one of the plurality of openings for locking engagement therewith, thereby to permit variation in the size of the bushing in the direction perpendicular to the longitudinal axis of the cylindrical portion.

8. A bushing according to claim 7, wherein the bushing is formed of a stiff but resiliently deformable material.

9. A bushing according to claim 8, wherein the material from which the bushing is formed is one of the group of materials consisting of linear polyethylene and nylon.

10. A bushing according to claim 7, wherein a circumferentially disposed, outwardly projecting rib is presented by the cylindrical portion between the ends thereof, the rib on the side of the discontinuity from which the pin projects terminating at a circumferential distance from the pin which is at least as large as the circumferential distance between the discontinuity and the opening which is circumferentially farthest spaced from the discontinuity, said at least one locking pin being disposed on the same side of the flange portion as the cylindrical portion.

11. A bushing according to claim 7, wherein the end of the cylindrical portion remote from said one end thereof is internally chamfered.

12. 1. A bushing according to claim 7, wherein the length of said at least one locking pin is substantially equal to the thickness of the flange portion.

13. A bushing according to claim 7, wherein the end of said at least one locking pin remote from the flange portion presents a lip which projects from the pin in a direction substantially transverse to the longitudinal axis of the cylindrical portion, the lip being spaced from the flange portion a distance substantially equal to the thickness of the flange portion.

14. A bushing according to claim 13, wherein said at least one locking pin is, in cross section, in the form of a major segment of a circle, and the lip and the end of the pin from which the lip is presented are together of substantially circular cross section, the flat face of the pin being substantially flush with the discontinuity in the flange portion.

15. A bushing according to claim 14, wherein at right angles to the plane containing the longitudinal axes of the cylindrical portion and of the pin, the pin is of progressively increasing width in the direction away from the flange portion.

16. A bushing according to claim 7, wherein said at least one locking pin comprises a plurality of circumferentially equispaced locking pins, the plurality of openings being circumferentially equispaced, with the distance between each opening and the opening adjacent thereto being substantially equal to the distance between each locking pin and the pin adjacent thereto.

17. A bushing comprising a substantially cylindrical portion having a longitudinal axis, and a flange portion which is presented at one end of the cylindrical portion and which projects outwardly from and around the cylindrical portion, the bushing which is formed of a flexible material being circumferentially discontinuous throughout its axial length, wherein the flange portion has on one side of the discontinuity a plurality of circumferentially spaced openings which are substantially equidistantly spaced from the longitudinal axis of the cylindrical portion and which are disposed substantially transverse to said axis, and wherein the flange portion presents on the other side of the discontinuity a projecting locking pin which is circumferentially disposed and which is spaced from the longitudinal axis of the cylindrical portion a distance substantially equal to the distance by which the openings are spaced from said axis, the pin presenting a projecting tooth and being disposable through any selected number of the openings from the opening circumferentially most closely adjacent to the discontinuity for locking engagement of the projecting tooth with the opening which, of the openings through which the pin is disposed, is circumferentially farthest spaced from the discontinuity, thereby to permit variation in the size of the bushing in the direction perpendicular to the longitudinal axis of the cylindrical portion.

* * * * *